US011225143B2

(12) United States Patent
Mittag et al.

(10) Patent No.: US 11,225,143 B2
(45) Date of Patent: Jan. 18, 2022

(54) SYSTEM HAVING AN INFOTAINMENT SYSTEM

(71) Applicant: AUDI AG, Ingolstadt (DE)

(72) Inventors: Björn Mittag, Unterstall (DE); Christoph Dalke, Kipfenberg (DE); Matthijs Paffen, Karlskron (DE); Hans Georg Gruber, Ingolstadt (DE)

(73) Assignee: Audi AG, Ingolstadt (DE)

( * ) Notice: Subject to any disclaimer, the term of this patent is extended or adjusted under 35 U.S.C. 154(b) by 179 days.

(21) Appl. No.: 16/328,917

(22) PCT Filed: Aug. 22, 2017

(86) PCT No.: PCT/EP2017/071099
§ 371 (c)(1),
(2) Date: Feb. 27, 2019

(87) PCT Pub. No.: WO2018/041664
PCT Pub. Date: Mar. 8, 2018

(65) Prior Publication Data
US 2019/0225082 A1    Jul. 25, 2019

(30) Foreign Application Priority Data

Aug. 29, 2016   (DE) .......................... 102016216228.4
Oct. 14, 2016   (EP) ..................................... 16193862

(51) Int. Cl.
*B60K 35/00*      (2006.01)
*H04L 29/08*      (2006.01)
(Continued)

(52) U.S. Cl.
CPC .............. *B60K 35/00* (2013.01); *B60K 37/06* (2013.01); *G06Q 30/06* (2013.01);
(Continued)

(58) Field of Classification Search
None
See application file for complete search history.

(56) References Cited

U.S. PATENT DOCUMENTS

2010/0234071 A1*   9/2010   Shabtay ................. H04B 7/155
                                                    455/562.1
2015/0100633 A1    4/2015   Barrett et al.
2015/0307106 A1*  10/2015   Rao ....................... B60W 40/09
                                                    701/29.1

FOREIGN PATENT DOCUMENTS

CN           103023964 A       4/2013
WO       WO-2013/106239        7/2013
WO       WO 2013106329 A1      7/2013

OTHER PUBLICATIONS

International Preliminary Report on Patentability directed to related International Patent Application No. PCT/EP2017/071099, dated Aug. 21, 2018, with attached English-language translation; 12 pages.

(Continued)

*Primary Examiner* — Thomas G Black
*Assistant Examiner* — Ana D Thomas
(74) *Attorney, Agent, or Firm* — Sterne, Kessler, Goldstein & Fox. P.L.L.C.

(57) ABSTRACT

The invention relates to a device for an infotainment system. The infotainment system has a computing unit, on which a first operating system is installed and can be executed. The device has a computing unit, on which a second operating system is installed and can be executed. Radio-supported communication with the Internet can be carried out using the second operating system. The device has at least one generic interface to the infotainment system, whereby applications designed for the second operating system can be provided using the infotainment system.

15 Claims, 3 Drawing Sheets

(51) Int. Cl.
*G06Q 30/06* (2012.01)
*B60K 37/06* (2006.01)
*H04W 4/40* (2018.01)

(52) U.S. Cl.
CPC ......... *G06Q 30/0631* (2013.01); *H04L 29/08* (2013.01); *H04L 67/04* (2013.01); *H04L 67/36* (2013.01); *H04W 4/40* (2018.02); *B60K 2370/122* (2019.05); *B60K 2370/164* (2019.05); *B60K 2370/182* (2019.05); *B60K 2370/583* (2019.05); *B60K 2370/589* (2019.05); *B60K 2370/5899* (2019.05)

(56) References Cited

OTHER PUBLICATIONS

International Search Report and Written Opinion of the International Searching Anthority directed to related International Patent Application No. PCT/EP2017/071099, dated Dec. 6, 2017, with attached English-language translation; 22 pages.

* cited by examiner

SYSTEM HAVING AN INFOTAINMENT SYSTEM

TECHNICAL FIELD

The invention relates to a device, a system comprising a device and an infotainment system, and a method for operating a device and an infotainment system.

An infotainment system can be arranged in a motor vehicle and can be designed to provide information about a current trip and/or operating parameters of the motor vehicle to occupants, generally at least to the driver. Furthermore, audio and video data can be presented to the occupants by means of the infotainment system via output apparatuses, e.g. via a monitor and via loudspeakers. It is possible that said audio and video data bear no relation to the trip or to the motor vehicle. The infotainment system can obtain information and/or data from the Internet.

BRIEF DESCRIPTION OF THE DRAWINGS/FIGURES

DETAILED DESCRIPTION

Figure 1:
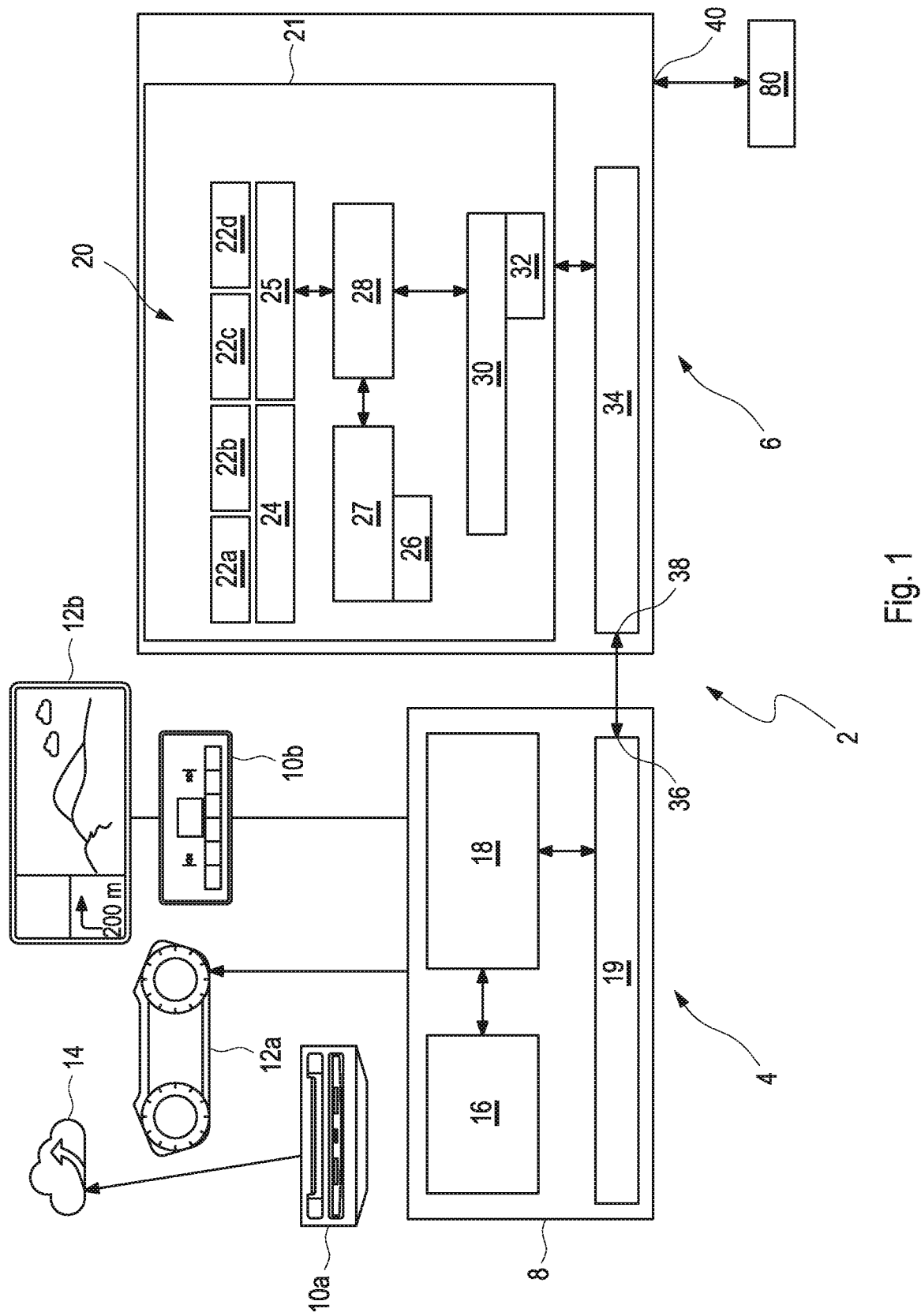
FIG. 1 illustrates a first schematic of an embodiment of a system according to some embodiments of this disclosure, which the system include an embodiment of the device.

In light of this, the problem addressed was that of using applications from the

Internet by means of an infotainment system without having to have an operating system intended for this purpose.

This problem is solved by means of a device, a system, and a method having the features of the independent claims. Embodiments of the device, of the system, and of the method are clear from the dependent claims and the description.

The device according to the invention is intended for an infotainment system that has a computing unit on which a first operating system is installed and can be executed, whereas the device has a computing unit on which a second operating system is installed and can be executed. Radio-supported communication with the Internet can be carried out by means of the second operating system. The device has at least one generic interface to the infotainment system, which likewise has at least one generic interface. By means of the infotainment system, applications intended and/or designed for the second operating system can be provided and/or used via the device. The first operating system is different from the second operating system.

In one design, the radio-supported communication of the device with the Internet is carried out indirectly via at least one generic radio interface of the infotainment system, which generic radio interface is usually designed as an antenna. It is possible that the infotainment system provides data to the device from the at least one generic interface of the infotainment system via the at least one generic interface of the device. The communication of the device with the Internet is enabled by means of the at least one generic radio interface of the infotainment system, said at least one generic radio interface being designed as an antenna in one design. In general, the infotainment system can communicate with the at least one generic interface of the device via a first generic interface and with the Internet via the generic radio interface. By means of the communication chain provided by the generic interfaces and the generic radio interface, the device has access to the Internet.

In one design, the infotainment system is arranged in a motor vehicle. The at least one generic radio interface of the infotainment system, which is designed as antenna, can at the same time also be designed as a generic radio interface of the motor vehicle, by means of which the radio-supported communication with the Internet can be carried out.

It is therefore possible, inter alia, for the infotainment system, by means of the device, to use a platform for the use of applications from the Internet that are designed for the second operating system but not for the first operating system.

A person can operate and/or control or should operate and/or control the device exclusively via the infotainment system.

The device is designed to exchange data with the infotainment system is the at least one generic interface.

In one design, the device is designed as a portable, mobile apparatus that can also be connected to another appliance, such as a further infotainment appliance, independently of the infotainment system by means of the at least one generic interface of said apparatus, said other appliance likewise having a generic interface accordingly. The same operating system as on the device or another operating system can be installed and executed on the further appliance.

The system according to the invention comprises a device, such as an embodiment of the device according to the invention, and an infotainment system. The infotainment system has a computing unit, on which a first operating system is installed and can be executed, and at least one generic interface. The device has a computing unit, on which a second operating system is installed and can be executed. By means of the second operating system, radio-supported communication with the Internet can be carried out. The device likewise has at least one generic interface. The generic interfaces of the device and of the infotainment system are compatible with each other, and thus applications that are intended and/or designed for the second operating system can be provided by means of the infotainment system. The two mentioned operating systems are different operating systems.

The system optionally has at least one antenna as a generic radio interface, which is designed as a component of the infotainment system, the device and the infotainment system exchanging data with the Internet only by means of the at least one antenna of the infotainment system as a generic radio interface. Accordingly, a separate antenna is not required for the device for communication with the Internet, because the device can communicate with the Internet and therefore exchange data with the Internet indirectly by means of the antenna of the infotainment system. It is possible that the generic radio interface or antenna of the infotainment system is at the same time designed as a generic radio interface of the motor vehicle.

In addition, the system comprises at least one input apparatus, such as a keypad and/or a touch-sensitive display field, which is designed as a component of the infotainment system. The device and the infotainment system can be operated only by means of the at least one input apparatus of the infotainment system. The person can use said at least one input apparatus as a human-machine interface for inputting commands and/or for operating the device. Accordingly, a separate input apparatus is not required for the device, because the device can be operated by means of the input apparatus of the infotainment system, Furthermore, it is provided that the has at least one output apparatus, for example a loudspeaker and/or a display field, optionally a touch-sensitive display field, which is designed as a component of the infotainment system. Information or content of the device and of the infotainment system can be acoustically and/or visually output and/or presented only by means of the at least one output apparatus of the infotainment system. Accordingly, a separate output apparatus is not required for the device, because information stored in the device and/or generated by the device is output by means of the input apparatus of the infotainment system.

In one design, the device has at least one electromechanical generic interface and the infotainment system has, in addition to the at least one generic radio interface, at least one electromechanical generic interface, in which case the device and the infotainment system can be or should be physically connected to each other by means of the respective corresponding electromechanical generic interfaces for exchanging data. The at least one electromechanical generic interface of the device is designed as a plug or socket and the at least one electromechanical interface of the infotainment system is accordingly designed as a socket or plug, by means of which plug and socket the device and the infotainment system can be mechanically connected to each other and can exchange data in a wired manner.

Alternatively or additionally, the device has at least one generic interface designed as an antenna and the infotainment system has, in addition to the at least one generic radio interface, at least one generic interface designed as an antenna, in which case the device and the infotainment system can be or should be connected to each other by means of the generic interfaces designed as antennas for mutually exchanging the data by means of electromagnetic waves. Thus, the data can be exchanged between the device and the infotainment system by means of signals, which are transmitted by means of electromagnetic waves.

The method according to the invention is provided for operating a device, for example an embodiment of the device according to the invention, and an infotainment system and thus an embodiment of the system according to the invention. The infotainment system has a computing unit, on which a first operating system is installed and executed. In contrast, the device has a computing unit, on which a second operating system is installed and executed, which differs from the first operating system. Radio-supported communication with the Internet is carried out by means of the second operating system. The device has at least one generic interface. The infotainment system likewise has at least one generic interface. It is provided that the infotainment system and the device mutually exchange data by means of said generic interfaces. When the method is carried out, applications intended and/or designed for the second operating system are provided by means of the infotainment system.

In the method, the device and the infotainment system communicate with the Internet by means of at least one generic radio interface of the infotainment system, which at the same time can also be designed as a generic radio interface of the motor vehicle.

For this purpose, the device and the infotainment system are at least temporarily connected to each other by means of the generic interfaces, and such a connection can also be disconnected again. In one design, the device can also be connected to different appliances, such as other infotainment systems or smartphones, in succession and/or in alternation.

By means of the method, an infotainment system of a motor vehicle can be operated, the device being arranged in the motor vehicle and being connected to the infotainment system by means of the generic interface. Furthermore, the device is connected to the Internet via the infotainment system and at least one generic radio interface of the infotainment system, which is generally designed as an antenna, which at least one generic radio interface of the infotainment system designed as an antenna can at the same time also be designed as a generic radio interface of the motor vehicle.

Control data for controlling the device and/or the infotainment system and payload data, such as audio data and/or video data, are exchanged as data between the device and the infotainment system.

In addition, an application and/or function of the second operating system can be directed and/or controlled and carried out by means of the infotainment system.

In the device, a usually open-source second operating system, such as Android® from Google, is installed and/or integrated in order to carry out mobile communication, and programs and/or applications or apps based on the second operating system can be executed by means of the device. The device comprises the at least one generic interface or a first interface part for separably coupling the device to the infotainment system, which for example is arranged in the motor vehicle, by means of which generic interface or first interface part data can be transferred between the infotainment system of the motor vehicle and the device so that programs based on the second operating system are displayed and/or operated by means of the infotainment system of the motor vehicle. Accordingly, a display field or display and/or a user input appliance, such as a keypad, is not required for the device.

The device also comprises a second interface part and thus a second generic interface for separately, e.g. wirelessly, coupling the device to another appliance, such as a mobile communication apparatus or smartphone, which likewise can be designed as and/or referred to as an infotainment system. In one design, the presented device having the second operating system can simultaneously be connected to various appliances, for example to the infotainment system of the motor vehicle and to the smartphone, provided that the smartphone is likewise arranged in the motor vehicle, by means of generic interfaces for exchanging data.

The first generic interface part of the device is designed for the bidirectional transfer of data between the infotainment system of the motor vehicle and the device. The first interface part is designed to transfer as data e.g., visual data, i.e., video data or image data, vehicle-specific data, audio data, microphone data and/or operation interaction data, which can be manually input into an input apparatus or input module, e.g., in the case of touch operation, of the infotainment system. In addition, the first interface part is designed for hardware authentication in the infotainment system of the motor vehicle and/or for connecting the device to the Internet via the infotainment system of the motor vehicle.

The infotainment system for a motor vehicle comprises, with the at least one generic interface, a first interface part that is compatible with the first interface part of the described device. In addition, the infotainment system is designed for separable coupling to an embodiment of the device.

The motor vehicle comprises an embodiment of the infotainment system. A generic radio interface designed as an antenna, for communication with the Internet, can be designed as a component of the infotainment system and of the motor vehicle.

By means of the device, a lightweight, loose integration of an embedded platform based on the second operating system into an infotainment system, for example a future infotainment system, of a motor vehicle is possible.

The device, which can also be designed as and/or referred to as an interface module, comprises the at least one generic interface, i.e., the first interface part and optionally the second interface part.

In one design, it can be provided that the device or the interface module is designed and/or defined by a producer of the motor vehicle. The device can also be designed as and/or referred to as an infotainment link.

In one design, for example a unidirectional and/or bidirectional transfer of video data or image data, vehicle-specific data, audio data, or operation interaction data, which can be input by means of contact operation or touch operation, and/or a hardware authentication is possible between the device and the infotainment system. In addition, a connection to the Internet can be provided by means of the second operating system of the device. Alternatively or additionally, the device can comprise a high-speed hardware interface, which enables a customer to exchange, without assistance, the computing unit to be installed in the device or an additional piece of hardware to be installed, in order to be able to follow development cycles of the semiconductor industry in the motor vehicle, because otherwise a hardware upgrade is not possible during the life of the motor vehicle.

The device can have a separated computing unit having at least one memory, e.g., RAM and/or flash, and can have the at least one generic interface as a connection module or connectivity module, in which case at least one connection (Bluetooth and/or WiFi) via electromagnetic waves can be provided by means of the at least one interface, which can be designed as a generic high-speed hardware interface, e.g., USB.

The second operating system is installed on the computing unit of the device. In addition, the second operating system can be executed by the computing unit and/or can run thereon, and the second operating system can be embedded into an environment of the infotainment system, on the computing unit of which the first operating system runs. In one design, it is provided that all data streams for inputs and/or outputs that can be provided by means of a display field or display or an audio interface, e.g., a microphone, are fed into the infotainment system via the at least one generic interface, e.g., a high-speed interface part. In the infotainment system, said data streams for input and/or output streams are processed in a coordinated manner and are displayed by means of the display apparatus or a display field of the infotainment system or acoustically output by means of a loudspeaker of the infotainment system. Acoustic and/or visual content that is provided by means of the data streams is centrally presented by means of the infotainment system of the motor vehicle. By means of the separated computing unit of the device, it is possible inter alia for a driver of the motor vehicle as a customer or user to add a flash memory for functional expansions by means of applications (apps) of the second operating system by use of a secure digital memory card or SD and/or microSD card.

It is possible that software (SW) for the second operating system and applications are integrated into the device by means of generic interfaces, which are usually specified or defined by a provider of the second operating system and of the software.

The device and the infotainment system are largely independent in relation to functional and systemic changes in the second operating system. It must be taken into consideration that the second operating system is further developed by the provider and/or producer thereof regularly, e.g., at six-month intervals, and can be updated within the device. Thus, over a long time period, an implementation on the side of the infotainment system and an associated development of software, e.g., of the second operating system, can be kept constant without adjustments or changes, the customer nevertheless being ensured access to the environment of the software or of the second operating system, even over several hardware (HW) generations.

It is possible to configure the device and to connect the device to a communication network that is independent of the motor vehicle. By combining the device with the infotainment system, a complete multimedia unit for playing images, music and/or games is possible.

Further advantages and designs of the invention result from the description and the enclosed drawings.

Of course, the features mentioned above and the features to be explained below can be used not only in the specified combination but also in other combinations or alone, without leaving the framework of the present invention.

The invention is illustrated schematically on the basis of embodiments in the drawings and is schematically and thoroughly described with reference to the drawings.

FIG. 1 shows a first schematic illustration of an embodiment of the system according to the invention, which system has an embodiment of the device according to the invention.

Figure 2:
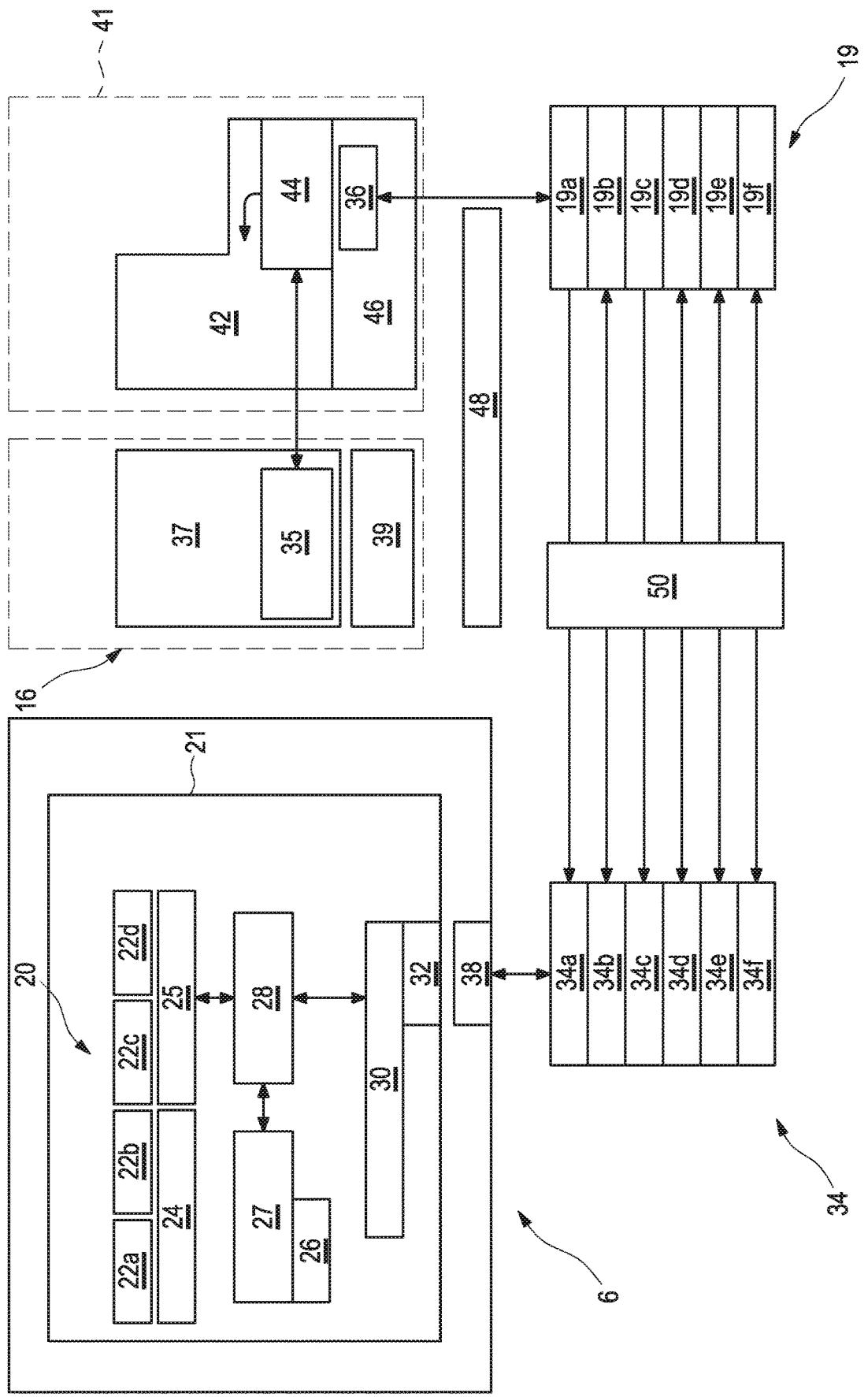
FIG. 2 illustrates a second schematic of the system, according to some embodiments of this disclosure.

FIG. 2 shows a second schematic illustration of the embodiment of the system according to the invention.

Figure 3:
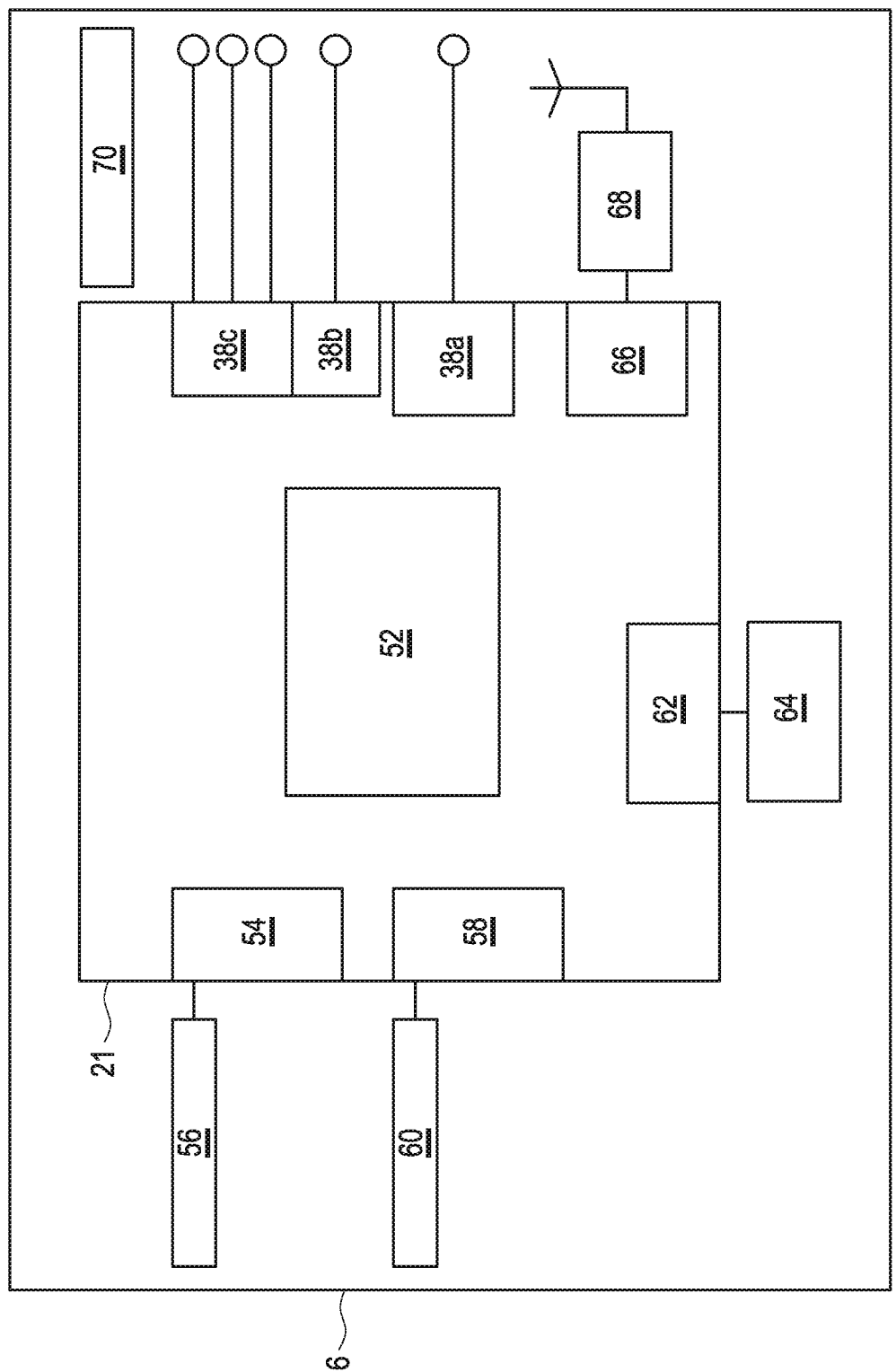
FIG. 3 illustrates a schematic detail of the device, according to some embodiments of this disclosure.

FIG. 3 shows, in schematic illustration, a detail of the device according to the invention.

The figures are described jointly. Identical components are assigned the same reference numbers.

The embodiment of the system 2 according to the invention that is schematically illustrated in FIG. 1 comprises an infotainment system 4, which is arranged in a motor vehicle here, and the embodiment of the device 6 according to the invention.

The infotainment system 4 comprises a computing unit 8 as a first component and, as further components, a plurality of input apparatuses 10a, 10b for the inputting of commands by an occupant of the motor vehicle and output apparatuses 12a, 12b for the audiovisual output and/or presentation of content. The infotainment system 4 comprises a drive for a CD or DVD as a first input apparatus 10a, according to some embodiments. Furthermore, the infotainment system 4 comprises an antenna, which is not presented further, as a generic radio interface for exchanging data with the Internet 14 by means of electromagnetic waves. Said antenna or generic radio interface can also be designed as a generic radio interface of the motor vehicle.

According to some embodiments, a second input apparatus 10b is designed as a touch-sensitive display field, which display field can also be referred to as a touch screen. According to some embodiments, a first output apparatus 12a is designed as a dashboard of the motor vehicle here, and a second output apparatus 12b is designed as a navigation apparatus.

A first operating system 16, which is provided by a producer of the infotainment system 4 and/or of the motor vehicle, is installed on the computing unit 8. When the first operating system 16 is executed, different tasks 18, such as security functions for the motor vehicle, display management, performance management and/or sound management, are controlled, by means of which in turn different data 19, for example for an input and/or output of a display field of an output apparatus 10a, 10b, a sound output, functions of the motor vehicle and/or an authentication, are exchanged.

The device 6 of the system 2 comprises a computing unit 21, on which a second operating system 20 is installed, which has a software architecture embedded into the motor vehicle. Here, the second operating system 20 comprises various applications 22a, 22b, 22c, 22d or application programs, a program interface 24 or API (application programming interface) for the second operating system 20, a program interface 25 or API (application programming interface) for the motor vehicle, utility software 27 for the second operating system 20, a hardware abstraction layer 26 or HAL for the second operating system 20, utility software 28 for the motor vehicle, utility software 30 for a network of the motor vehicle, and a hardware abstraction layer 32 or HAL for the motor vehicle. Different data 34, for example an input and/or output of a display field of an output apparatus 10a, 10b, a sound output, functions of the motor vehicle and/or an authentication, can be exchanged with the second operating system 20.

The infotainment system 4 has a generic interface 36 and the device 6 has a generic interface 38, by means of which generic interfaces the infotainment system 4 and the device 6 exchange data. In addition, the device 6 has a further generic interface 40, by means of which the device 6 can also exchange data with a further appliance 80, here a smartphone, the appliance 80 having a generic interface for this purpose, as shown in FIG. 2.

In the schematic illustration in FIG. 2, further details of the first operating system 16 on the computing unit 8 of the infotainment system 4 are shown in addition to the device 6. The first operating system 16 comprises a main software module 37 having an embedded program interface 35 or API (application programming interface) for the second operating system 20 and a further software module 39. In addition, it is provided here that, on the computing unit 8, a system module 41 is installed, which comprises original functions 42, e.g., for presenting audiovisual data, and an embedded program interface 44 or API (application programming interface) for the second operating system 20. Furthermore, the system module 41 comprises a further software module 46 for the generic interface 36 of the infotainment system 4. Here, a hypervisor 48 is associated with the first operating system 16 and the system module 41.

The generic interface 36 of the infotainment system and the generic interface 38 of the device 6 are connected to each other here by means of a serial bus system 50, e.g., USB, via the two generic interfaces 36, 38, data 19a, 34a for a display and data 19c, 34c for an audio output are provided to the device 6 by the infotainment system 4. In addition, data 19b, 34b for operating an input apparatus 10a, 10b, data 19d, 34d for controlling the motor vehicle, data 19e, 34e from the Internet, and data 19f, 34f for authentication are exchanged between the infotainment system 4 and the device 6.

In FIG. 3, further details of the device 6 are schematically illustrated. The computing unit 21 comprises a processor core 52 (multi-core), a MEM 54, by means of which the computing unit 21 is connected to a first memory 56, and an MMC 58, by means of which the computing unit 21 is connected to a second memory 60. The computing unit 21 can be connected to an energy source 64 of the infotainment system 4 by means of an energy connection 62. By means of a communication connection 66, the computing unit 21 can be connected to an antenna 68 as a generic radio interface of the infotainment system 4, by means of which antenna the computing unit 21 can exchange data with the Internet 14. Furthermore, the computing unit 21 comprises a first generic interface 38a (HDMI), a second generic interface 38b (SD), and a third generic interface 38c (USB). In addition, the device 6 comprises a hardware authentication means 70 for authenticating hardware.

The invention claimed is:

1. A system, comprising:
    an infotainment system of a motor vehicle, wherein the infotainment system comprises:
        a first computing unit, on which a first operating system is installed and executed;
        a first generic interface; and
        an antenna forming an integrated component of the infotainment system, wherein the antenna provides a generic radio interface; and
    a device comprising:
        a second computing unit, on which a second operating system is installed and executed, wherein communication with the Internet is carried out using the second operating system; and
        a second generic interface, via which applications designed for the second operating system are made available using the infotainment system,
    wherein the infotainment system and the device mutually exchange data using the first and second generic interfaces, and
    wherein the device and the infotainment system exchange the data with the Internet using only the antenna of the infotainment system, and the device indirectly exchanges the data with the Internet using the antenna of the infotainment system.

2. The system according to claim 1, further comprising:
    at least one input apparatus, which forms a second integrated component of the infotainment system, wherein the device and the infotainment system are operated using only the at least one input apparatus of the infotainment system.

3. The system according to claim 2, wherein the at least one input apparatus comprises a keypad or a touch-sensitive display field.

4. The system according to claim 1, further comprising:
    at least one output apparatus, which forms a third integrated component of the infotainment system, wherein information or content of the device and of the infotainment system is output only using the at least one output apparatus of the infotainment system.

5. The system according to claim 4, wherein the at least one output apparatus comprises a loudspeaker, a touch-sensitive display field, or a rotary pushbutton.

6. The system according to claim 1, wherein the device further comprises a first electromechanical generic interface and the infotainment system comprises a second electromechanical generic interface, and wherein the device and the infotainment system are physically connected to each other by means of the first and second electromechanical generic interfaces for mutually exchanging the data.

7. The system according to claim 1, wherein the device further comprises a second antenna, and wherein the device and the infotainment system are connected to each other using the antenna and the second antenna for exchanging the data by using electromagnetic waves.

8. The system according to claim 1, wherein the device is operated using the infotainment system.

9. The system according to claim 1, wherein the device is configured to exchange the data with the infotainment system using the second generic interface.

10. The system according to claim 1, wherein the device comprises a portable, mobile apparatus, which is also connected to another infotainment appliance independently of the infotainment system using the second generic interface.

11. A method for operating a device and an infotainment system of a motor vehicle, wherein the infotainment system comprises a first computing unit, on which a first operating system is installed and executed, a first generic interface, and an antenna providing a generic radio interface of the infotainment system, wherein the device comprises a second computing unit, on which a second operating system is installed and executed and radio-supported communication with the Internet is carried out using the second operating system, wherein the device further comprises a second generic interface, via which applications designed for the second operating system are made available using the infotainment system, the method comprising:

mutually exchanging data between the infotainment system and the device using the first and second generic interfaces; and exchanging data between the device and the infotainment system with the Internet using only the antenna of the infotainment system, wherein the device indirectly exchanges data with the Internet using the antenna of the infotainment system.

12. The method according to claim 11, wherein the device is arranged in the motor vehicle and is connected to the infotainment system using the first and second generic interfaces.

13. The method according to claim 11, wherein the radio-supported communication between the device and the Internet is carried out using the generic radio interface of the infotainment system or the motor vehicle that is designed as the antenna.

14. The method according to claim 11, wherein control data for controlling the device or the infotainment system and payload data are exchanged as the data between the device and the infotainment system.

15. The method according to claim 14, wherein the payload data comprises audio data and/or video data.

* * * * *